(12) United States Patent
Madden et al.

(10) Patent No.: US 6,396,061 B1
(45) Date of Patent: May 28, 2002

(54) ACTIVELY DRIVEN THERMAL RADIATION SHIELD

(75) Inventors: Norman W. Madden, Livermore; Christopher P. Cork, Pleasant Hill; John A. Becker, Alameda; David A. Knapp, Livermore, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/406,913

(22) Filed: Sep. 24, 1999

(51) Int. Cl.⁷ .......................... G12B 15/00; G01T 1/40
(52) U.S. Cl. ........................ 250/370.15; 250/339.03
(58) Field of Search .................. 250/370.15, 339.03

(56) References Cited

U.S. PATENT DOCUMENTS

| | | | |
|---|---|---|---|
| 4,990,782 A | * | 2/1991 | Wellman et al. ............. 250/352 |
| 5,075,555 A | * | 12/1991 | Woldseth et al. ......... 250/370.15 |
| 5,552,609 A | * | 9/1996 | Katagiri ................. 250/370.15 |
| 5,604,349 A | * | 2/1997 | Bert et al. ............. 250/370.15 |
| 5,811,816 A | * | 9/1998 | Gallagher et al. ....... 250/370.15 |

FOREIGN PATENT DOCUMENTS

GB     2 294 362 A   *   4/1996   ........... F25B/21/02

* cited by examiner

Primary Examiner—Constantine Hannaher
Assistant Examiner—Albert Gagliardi
(74) Attorney, Agent, or Firm—L. E. Carnahan; Alan H. Thompson

(57) ABSTRACT

A thermal radiation shield for cooled portable gamma-ray spectrometers. The thermal radiation shield is located intermediate the vacuum enclosure and detector enclosure, is actively driven, and is useful in reducing the heat load to mechanical cooler and additionally extends the lifetime of the mechanical cooler. The thermal shield is electrically-powered and is particularly useful for portable solid-state gamma-ray detectors or spectrometers that dramatically reduces the cooling power requirements. For example, the operating shield at 260K (40K below room temperature) will decrease the thermal radiation load to the detector by 50%, which makes possible portable battery operation for a mechanically cooled Ge spectrometer.

20 Claims, 1 Drawing Sheet

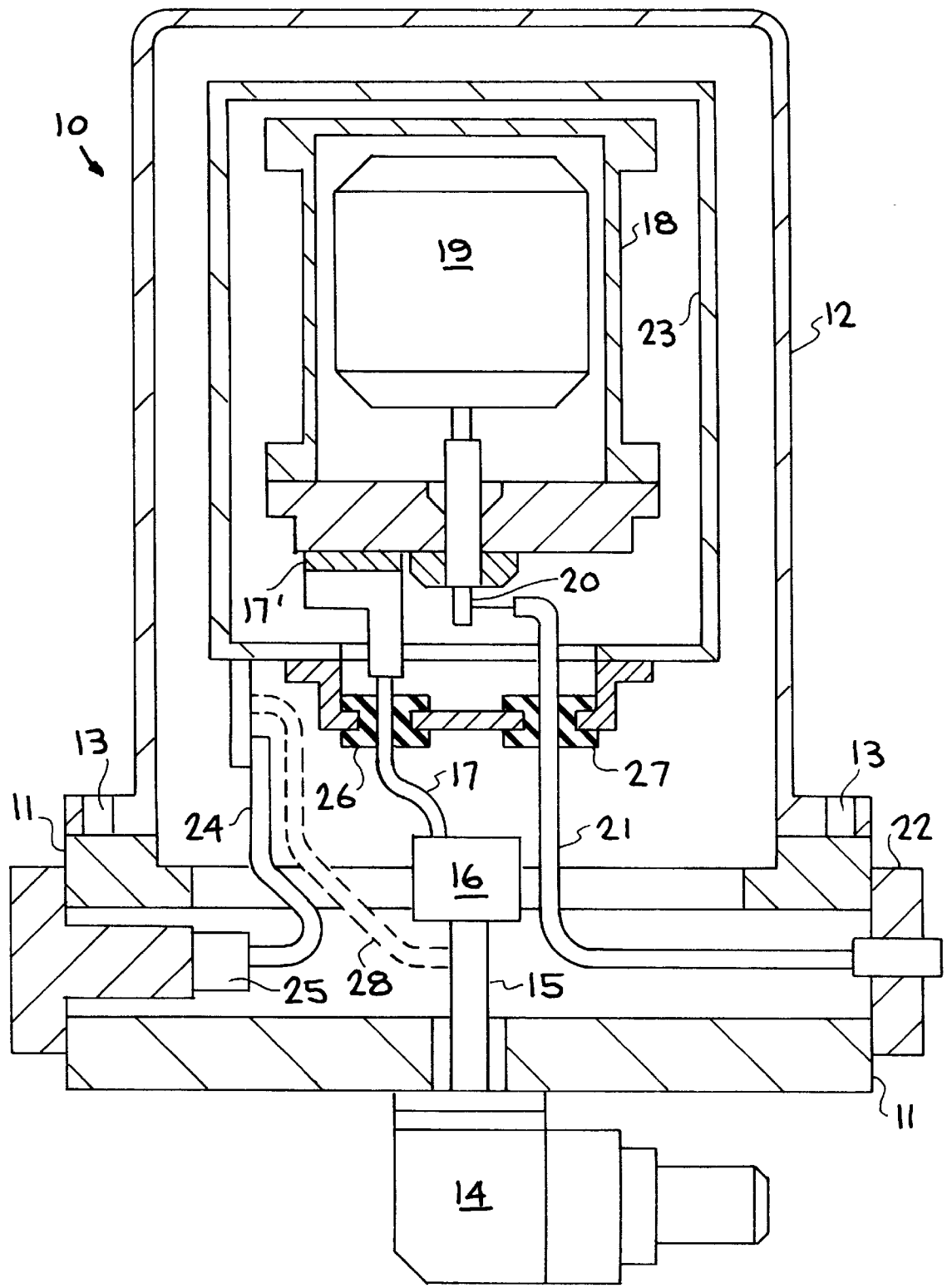

ACTIVELY DRIVEN THERMAL RADIATION SHIELD

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to portable spectrometers, particularly to mechanically cooled portable spectrometers, and more particularly to an actively driven thermal radiation shield for a mechanically cooled portable germanium gamma-ray spectrometer.

Solid-state gamma ray detectors, such as used in x-ray and gamma ray spectrometers, use high purity germanium (GE) crystals that must be cooled to low temperatures (~100K) for operation. This cooling is usually provided by a cold finger using a liquid cryogen, such as liquid nitrogen (LN). Typically, commercial solid-state detectors use at least 1 liter of the cryogen per day, making long-term unattended use of these detectors impractical. Thermal shielding has been considered to reduce the consumption of the cryogen caused by heat transmitted from the environment to the cooled detector.

Heat is transmitted from the environment to a cooled object in three ways; by convection, conduction, and radiation. For a cooled gamma ray detector, convection is the most significant, and is eliminated by placing the detector in a vacuum chamber. Conduction is minimized by careful construction of the mechanical support for and electrical connections to the detector.

The radiative heating of a detector inside a container is governed by the Stefan-Boltzmann equation:

$$E = F\sigma \epsilon_C \epsilon_D (T_C^4 - T_D^4)$$

Where E is the heating power in watts, F is a form factor accounting for geometry, $\sigma$ is the Boltzmann constant, $\epsilon_C$ and $\epsilon_D$ are the emissivities of the container and detector, respectively, and $T_C$ and $T_D$ are the temperatures of the container and detector. The heating power can be dramatically reduced by reducing the temperature of the container, $T_C$. However, practical considerations make the direct reduction of the container temperature impractical in most cases. However, enclosure of the detector in a thermal shield achieves the same effect. Since $T_D$ is much less than $T_C$, the power radiated from the thermal shield to the detector is reduced by approximately a factor $$E_S/E = T_S^4/T_C^4$$

where $E_S$ is the power radiated from the thermal shield and $T_S$ is the temperature of the thermal shield.

As a typical example, consider a container at room temperature (300K) and a thermal shield at −20° C. (253K). The relative radiative load on the detector is $(253/300)^4 = 0.51$, or a reduction of a factor of 2. Current methods of thermal shielding involve intricate layering of aluminized mylar sheets, typically yielding only a 10–15% reduction in the thermal radiative load. However, this complicates the residual vacuum. Such small reduction is not sufficient to enable long-term unattended use of the detectors. Thus, there has been a need for a way of substantially reducing the amount of heat lift required to maintain mechanically-cooled Ge detectors, and thus enable long-term unattended use.

The present invention provides a solution to the above-referenced problem by providing a mechanically-cooled Ge detector that requires only electrical power to maintain the required operating temperature via an electrically-powered thermal radiation shield. The electrically-powered thermal shield for solid-state gamma-ray detectors dramatically reduces the cooling power requirement for Ge detectors. Thus, since the thermal shield of the present invention can dramatically decrease the power required to cool the detector, it makes low-power mechanically cooled and long-lifetime nitrogen-cooled detectors possible. The thermal shield is constructed of a thin high-thermal-conductivity, low-Z material which maintains the entire shield at a uniform temperature, while minimizing gamma-ray absorption by the shield. The shield and inside wall of the container may be polished or gold-plated, for example, to minimize emissivity.

SUMMARY OF THE INVENTION

It is an object of the present invention to provide cooled solid-state gamma-ray detectors.

A further object of the invention is to provide a thermal shield for a cooled solid-state gamma-ray detector.

A further object of the invention is to provide a lower ultimate detector temperature using an electrically-powered thermal shield.

Another object of the invention is to provide a solid-state germanium gamma-ray detector with a thermal shield cooling arrangement achieved by use of a Peltier thermoelectric cooler, or alternatively, a tap midway on the cooler cold finger.

Another object of the invention is to provide a thermal shield for a germanium detector having low power consumption enabling battery power or solar power capability.

Another object of the invention is to provide a cooling shield for a detector which is constructed of thin high-thermal-conductivity, low-Z material to maintain a uniform temperature and minimize gamma-ray absorption.

Another object of the invention is to provide an electrically-powered thermal shield for solid-state gamma-ray detectors that reduces the cooling power requirements which can be used with conventional detectors cooled by liquid cryogen and a cold finger as well as mechanically-cooled detectors, thus making low-power mechanically cooled and long-lifetime liquid cryogen-cooled detectors possible.

Other objects and advantages of the present invention will become apparent from the following description and accompanying drawing. The present invention involves a thermal shield for cooled solid-state gamma-ray detectors. The thermal shield is located intermediate the detector and the vacuum enclosure, and is electrically-powered. Cooling of the thermal shield is achieved by use of a Peltier thermoelectric cooler or by a tap located midway on the cooler cold finger, and the power to operate the cooler is typically about 3 watts, which can readily be provided by battery power. The thermal shield is especially advantageous for mechanically-cooled detectors, for which the cooling power to the detector itself is extremely limited, and for which the entire cooling system is electrically powered. As a typical example, with a container at room temperature (300K) and a thermal shield at −20° C. (253K), the relative radiative load on the detector is $(253/300)^4 = 0.51$, or a reduction of a factor of 2. The thermal shield is constructed of a thin (0.060" to 0.085") high-thermal-conductivity, low-Z material, such as aluminum, magnesium or beryllium. The high thermal conductivity maintains the entire shield at a uniform temperature, while the low atomic number (low-Z) minimizes gamma-ray absorption by the shield. Additionally, the shield should be as thin as possible to minimize gamma-ray absorption, and polished or gold-plated, for example, to minimize emissivity.

BRIEF DESCRIPTION OF THE DRAWINGS

The accompanying drawing, which is incorporated into and forms a part of the disclosure, illustrates an embodiment of the invention and, together with the description, serves to explain the principles of the invention.

The single FIGURE is a partial cross-sectional view of a mechanically-cooled Ge spectrometer utilizing a thermal shield, made in accordance with the present invention, located intermediate between an encapsulated Ge detector and a vacuum enclosure.

DETAILED DESCRIPTION OF THE INVENTION

The present invention is directed to an actively driven thermal radiation shield and is particularly applicable for use in a handheld battery operated mechanically-cooled detector for a germanium (Ge) spectrometer for field use. The actively driven thermal shield greatly reduces the thermal radiation load to the mechanically cooled Ge spectrometer (50% reduction if the thermal shield is operated at 260K) making possible portable battery operation. Additionally, the service life of the Ge detector of the spectrometer is enhanced due to operation of the mechanical cooler at reduced power levels. A lower detector temperature is especially important when the Ge gamma-ray spectrometer is subjected to a radiation damage environment such as accelerator based nuclear physics experiments, reactor work, or satellite based astrophysics application.

Cooling of the thermal shield is achieved by use of a Peltier thermoelectric cooler or by a tap located midway on the cooler cold finger. The power necessary to operate the cooler is typically about 3 watts, which can easily be provided by battery power. The use of a thermal shield is especially advantageous for mechanically-cooled detectors, since the cooling power to the detector itself is extremely limited, and also since the entire cooling system is electrically powered.

The electrically-driven or cooled thermal shield is located in the embodiment illustrated in the drawing intermediate between a detector enclosure and a vacuum enclosure. The electrically-powered thermal inner shield reduces the cold tip thermal burden dramatically, since radiative heating is governed by the Stefan-Boltzmann relationship. For example, consider a thermal inner shield at 250K, and an outer container at 300K and the detector at 100K. The power radiated from the inner shield to the detector is approximately ½ the power radiated from the outer container $(250/300)^4=0.48$]. Conductive heat load is minimized by mechanical design. Convective cooling is eliminated by maintaining a vacuum between the outer container inner wall and the detector.

Spectrometer vacuum requirements are significantly reduced by detector encapsulation, and detector shelf and field life is significantly enhanced. Only a utility vacuum need be maintained between the outer container inner wall and outer detector encapsulation wall. This vacuum is easily maintained by thermally or electrically activated metal vacuum low temperature getters. The encapsulated detector no longer requires cryopumps, and therefor surface contaminants and hence surface currents do not increase with time and eventually destroy precision operation.

The electrically-powered cooling shield is constructed of a high-thermal-conductivity, low atomic number (low-Z) material, such as aluminum, magnesium, and beryllium. The high thermal conductivity (conductivity of 0.5 w/cm-K to 2.0 w/cm-K) maintains the entire shield at a uniform temperature, while the low atomic number minimizes gamma-ray absorption by the shield. Additionally, the shield should be as thin (0.060" to 0.085") as possible to minimize gamma-ray absorption, and polished or gold-plated to minimize emissivity. The encapsulated detector, driven inner shield, micro-cooler, and flexible coupling between the encapsulated Ge detector and the micro-cooler are illustrated in the single FIGURE. A sapphire interface provides electrical isolation while maintaining the thermal conduction. The electrical lead between the detector and outer vacuum container is coaxial, reducing microphonics.

Referring now to the drawing, the single figure illustrates an embodiment of the actively driven thermal radiation shield for a mechanically-cooled portable germanium (Ge) gamma-ray spectrometer made in accordance with the present invention. The Ge spectrometer, generally indicated at 10 includes a housing generally indicated at 11 to which a vacuum enclosure 12 is attached, as by bolts, etc. via opening 13 in enclosure 12, a microcooler 14 is mounted in housing 11 and includes a member or finger 15 having a cold tip 16 at one end connected via a flexible coupling 17 to detector enclosure 18 via an electrically isolating sapphire disk 17'; and within which is mounted a Ge detector 19. The detector 19 operatively connected to a signal and HV lead 20 which is connected to one end of a coaxial cable 21 having an opposite end connected to a pick-off member 22, mounted to housing 11. Positioned intermediate vacuum enclosure 12 and detector enclosure 18 is an actively driven thermal radiation or inner shield 23 connected by a flexible coupling 24 to a thermoelectric (Peltier) cooler 25 mounted in housing 11. Inner shield 23 is provided with cable or coupling pass-throughs 26 and 27 for flexible coupling 17 and coaxial cable 21. If desired the thermal shield 23 may be cooled by a thermal tap or flexible coupling 28 connected midway on the cold finger 15 of the microcooler 14, as indicated by dotted lines.

By way of example, the thermoelectric cooler 25 may operate a ~250K, the microcooler cold tip at ~90K, the inner shield 23 at ~250K, the Ge detector 19 at ~90K, with the vacuum within environment within enclosure 12 being ~18 psig $N_2$. While not shown, the inner shield 23 and the detector enclosure 18 may be supported within vacuum enclosure 12 by fiberglass tubes, for example, and the flexible couplings 17 and 24 may include a copper conductor. The housing 11, vacuum enclosure 12, detector enclosure 18, and the inner shield 23 are composed of aluminum, but may be constructed of other high-thermal-conductivity, low-Z material such as beryllium or magnesium having a conductivity in the range of 0.5 to 2.0 W/cm-K, and an atomic number in the range of 4 to 13. The inner shield 23 has a thickness of 0.060" to 0.085", and may be polished or gold-plated, for example, to minimize emissivity. Other plating materials such as silver may be used in place of gold. The spectrometer 10 has a weight of about 8 pounds and a low overall power consumption of not greater than about 5 watts, with the Peltier cooler 25 for inner shield 23 having a power consumption of about 1 watt, thus a battery such as a known 200 amp-hour power battery may be utilized to power the portable Ge spectrometer 10.

It has thus been shown that the actively driven thermal shield of the present invention provides a substantial advance in the field of gamma-ray detectors and spectrometers, and enables portable field use of such. The thermal shield provides a reduction in the radiative load on the detector by a factor of 2, and thus is particularly advantageous for mechanically-cooled detectors, which enables a substantial reduction in power consumption.

While a particular embodiment of the invention has been illustrated and described, and particular materials, parameters, etc. have been set forth to exemplify and teach the principles of the invention, such are not intended to be limiting. Modifications and changes may become apparent to those skilled in the art, and it is intended that the invention be limited only by the scope of the appended claims.

What is claimed is:

1. In a spectrometer including a cooled detector assembly within a detector enclosure mounted within a vacuum enclosure, the improvement comprising:
    an actively driven thermal radiation shield located intermediate said detector enclosure for said cooled detector assembly and said vacuum enclosure, and
    means for cooling said shield to a temperature intermediate a temperature of said detector assembly and said vacuum enclosure.

2. The improvement of claim 1, wherein said means includes a cooler selected from the group consisting of a thermoelectric cooler and a microcooler.

3. The improvement of claim 2, wherein said means additionally includes a flexible coupling interconnecting either said thermoelectric cooler or said microcooler and said shield.

4. The improvement of claim 3, wherein said means additionally includes a tap located midway on said means for cooling.

5. The improvement of claim 1, wherein said means comprises a Peltier thermoelectric cooler connected to said shield by a flexible coupling.

6. The improvement of claim 1, wherein said cooled detector assembly is cooled by a microcooler connected thereto via a flexible coupling.

7. The improvement of claim 1, wherein said cooled detector assembly is operatively connected to a point of use via at least a signal and HV lead and a coaxial cable.

8. The improvement of claim 1, wherein said shield is constructed of a high-thermal-conductivity, low-Z material.

9. The improvement of claim 8, wherein said material is selected from the group consisting of aluminum, magnesium, and beryllium.

10. The improvement of claim 8, wherein said material has a thickness in the range of 0.060" to 0085".

11. In a portable, handheld germanium gamma-ray spectrometer, the improvement comprising:
    an electrically cooled thermal radiation shield,
    said thermal radiation shield being constructed of a thin high-thermal-conductivity, low atomic number material,
    said cooled radiation shield being located intermediate a vacuum enclosure and a detector enclosure of said spectrometer.

12. The improvement of claim 11, wherein said cooled radiation shield is cooled by a thermoelectric cooler.

13. The improvement of claim 12, wherein said cooled radiation shield has a thickness of 0.060" to 0.085".

14. The improvement of claim 12, wherein said radiation shield is composed of material selected from the group consisting of aluminum, magnesium, and beryllium.

15. The spectrometer of claim 11, wherein said cooled radiation shield is cooled by a Peltier thermoelectric cooler via a flexible coupling.

16. The spectrometer of claim 11 including a battery for driving said electrically cooled thermal radiation shield.

17. The spectrometer of claim 11, wherein said cooled radiation shield is cooled via a tap located midway on a cold finger of a cooler.

18. In a cooled detector having an enclosure enclosed within a vacuum enclosure, the improvement comprising:
    an actively driven thermal radiation shield located intermediate said cooled detector enclosure and said vacuum enclosure, and
    a cooler for driving said thermal radiation shield.

19. The improvement of claim 18, wherein said thermal radiation shield is composed of a high-thermal-conductivity, low-Z material having a thickness in the range of 0.060" to 0.085".

20. The improvement of claim 18, wherein said cooler is selected from the group consisting of thermoelectric coolers and microcoolers.

* * * * *